United States Patent [19]

Einaj et al.

[11] Patent Number: 5,408,427
[45] Date of Patent: Apr. 18, 1995

[54] DETECTION OF EXPONENT UNDERFLOW AND OVERFLOW IN A FLOATING POINT ADDER

[75] Inventors: Alick Einaj, Nathanya; Yoram Horen, Rehovot; Yehuda Volpert, Petach Tikva, all of Israel

[73] Assignee: Motorola, Inc., Schaumburg, Ill.

[21] Appl. No.: 194,534

[22] Filed: Feb. 10, 1994

[30] Foreign Application Priority Data

Feb. 10, 1993 [GB] United Kingdom ............... 9303378

[51] Int. Cl.⁶ .................................................. G06F 7/38
[52] U.S. Cl. ......................................... 364/748; 364/745
[58] Field of Search ........................... 364/748, 745

[56] References Cited

U.S. PATENT DOCUMENTS

| | | | |
|---|---|---|---|
| 4,562,553 | 12/1985 | Mattedi et al. | 364/748 |
| 4,758,972 | 7/1988 | Frazier | 364/745 |
| 4,922,446 | 5/1990 | Zurawski et al. | 364/748 |
| 5,021,986 | 6/1991 | Nakamura | 364/748 |
| 5,027,308 | 6/1991 | Sit et al. | 364/745 |
| 5,075,882 | 12/1991 | Sakai et al. | 364/748 |
| 5,111,421 | 5/1992 | Molnar et al. | 364/748 |

*Primary Examiner*—Tan V. Mai
*Attorney, Agent, or Firm*—Lee E. Chastain

[57] ABSTRACT

An exponent subtractor system (226) for a floating point adder (200) generates an exponent result (EXP_low) and a rounded exponent result (EXP_high) for an addition operation performed on two floating point numbers and generates overflow (Overflow_low, Overflow_high) and underflow flags (Underflow_low, Underflow_high) for the exponent result and the rounded exponent result before the completion of the updating of the exponent result in an exponent subtractor (52, 72).

17 Claims, 5 Drawing Sheets

UNDERFLOW GENERATION LOGIC

FIG. 8

OVERFLOW GENERATION LOGIC

DETECTION OF EXPONENT UNDERFLOW AND OVERFLOW IN A FLOATING POINT ADDER

FIELD OF THE INVENTION

This invention relates to floating point adders and more particularly to the detection of underflow and overflow of the exponent results generated by floating point adders.

BACKGROUND OF THE INVENTION

Floating point numbers comprise a mantissa part and an exponent part and are usually 32-bit ('single precision') or 64-bit ('double precision') in size. The formats of floating point numbers depend on the standard implemented. For example, the widely implemented IEEE standard has the format 1.fff X $2^e$ where 1.fff is the normalised mantissa and e is the exponent.

A floating point addition operation (which may be a subtract operation depending on the sign of the floating point number(s)) for two floating point numbers typically comprises the following steps:

1). Calculate the difference between the two exponents.
2). Shift the mantissa of the smaller number right by the absolute value of the exponent difference so as to align the smaller number to the greater number.
3). Add the two mantissas.
4). Normalise the addition result
   a) Find the leading 'one' ('1') bit of the mantissa's addition result (result of step 3).
   b) Shift the mantissa's addition result to the left to discard all the leading zeros until the leading '1' bit becomes the Most Significant Bit (MSB) of the result (in case of subtract operation).
   c) Encode the number of left shifts required to a binary value for updating the exponent result.
5). Subtract the binary value from the exponent value in order to update the result of the floating point addition operation. This result is the exponent result (EXP_low).
6). Round the result. After rounding, the final exponent result may be one of two possible values: exponent result, EXP_low or rounded exponent result, EXP_high, where EXP_high=EXP_low+1.
7). Check that the final exponent result has a value within a predetermined range and generate overflow and underflow flags accordingly.
8). Result is driven to an output of the floating point adder.

The final exponent result is the rounded exponent result (EXP_high) only if the mantissa addition result comprises all '1's such that on rounding, the mantissa overflows. Otherwise, the final exponent result is the exponent result (EXP_low).

The detection of underflow and overflow of the final exponent result and generation of corresponding flags occurs in the critical path of the floating point adder. Typically, the detection and generation of underflow and overflow occur after the exponent result has been updated and rounded as necessary. The delay time required for such a step is in the critical path, and therefore limits the performance of the floating point adder. Another disadvantage with known floating point adders is that the logic required for underflow and overflow detection is complicated and requires significant area to implement.

There is therefore a need to provide an improved floating point adder system which performs faster detection of underflow and overflow of the exponent results.

SUMMARY OF THE INVENTION

In accordance with the invention there is provided a method of generating an exponent result and a rounded exponent result for an addition operation performed on two numbers in a floating point adder and for generating overflow and underflow flags for the exponent result and the rounded exponent result, wherein each number comprises an exponent and an mantissa, the method comprising the steps of:

generating first and second exponent values using the greater exponent of the two numbers, each of the first and second exponent values comprising n bits;

providing a binary value which represents a number of bit shifts required to normalise a mantissa result produced by the addition operation, the binary value comprising m bits, where m is less than n;

dividing each one of the first and second exponent values into two groups of bits, a first group comprising m of the least significant bits of an exponent value and a second group comprising (n-m) of the most significant bits of the exponent value;

decrementing the second group of (n-m) bits of each of the first and second exponent values by one so as to provide a decremented most significant bit result for the each of the first and second exponent values;

detecting underflow of the exponent result and rounded exponent result by checking the decremented most significant bit result of the first exponent value and the second group of (n-m) bits of the first exponent value respectively and generating in response to the checking step first and second underflow flags respectively;

detecting overflow of the exponent result and rounded exponent result by checking the decremented most significant bit result of the second exponent value and the second group of (n-m) bits of the second exponent value respectively and generating in response to the checking step first and second overflow flags respectively;

subtracting the binary value from the first group of m bits of each of the first and second exponent values so as to provide a least significant bit subtraction result and borrow flags for each of the first and second exponent values, the borrow flags indicating whether the subtraction step generates a borrow of one or the subtraction step generates a borrow of zero;

selecting for each of the first and second exponent values and in response to the borrow flags, the respective decremented most significant bit result for a borrow of one or the respective second group of (n-m) bits for a borrow of zero so as to provide a selected result for each of the first and second exponent values;

combining for each of the exponent values the respective selected result with the respective least significant bit subtraction result so as to generate the exponent result and the rounded exponent result; and providing the exponent result and corresponding first underflow flag and first overflow flag and providing the rounded exponent result and corresponding second underflow flag and second overflow flag at outputs of the floating point adder.

BRIEF DESCRIPTION OF THE DRAWING

A method of detecting and generating overflow and underflow flags in a floating point adder in accordance with the invention will now be described, by way of example only, with reference to the accompanying drawings in which.

DETAILED DESCRIPTION OF THE DRAWINGS

The IEEE double-precision format has one sign bit, eleven exponent bits and fifty-two fraction bits. The double-precision format is biased by adding $+1023$: exponents should therefore be in the range $-1022$ to $+1023$.

The IEEE single-precision format has one sign bit, eight exponent bits and 23 bits of data. The single-precision format is biased by adding $+127$: exponents should therefore be in the range $-126$ to $+127$.

In systems which implement both single-precision and double-precision formats, the inputted floating point numbers are normally represented in double-precision format so that the exponents of all numbers inside floating point adders are biased with the double-precision biasing of $+1023$. This means that an exponent result in single-precision format is valid in the range $+897$ ($-126+1023$) to $+1150$ ($127+1023$) and in double-precision format is valid in the range $+1$ ($-1023+1023$) to $+2046$ ($1023+1023$). This convention will be adopted in order to describe the present invention.

Figure 1:
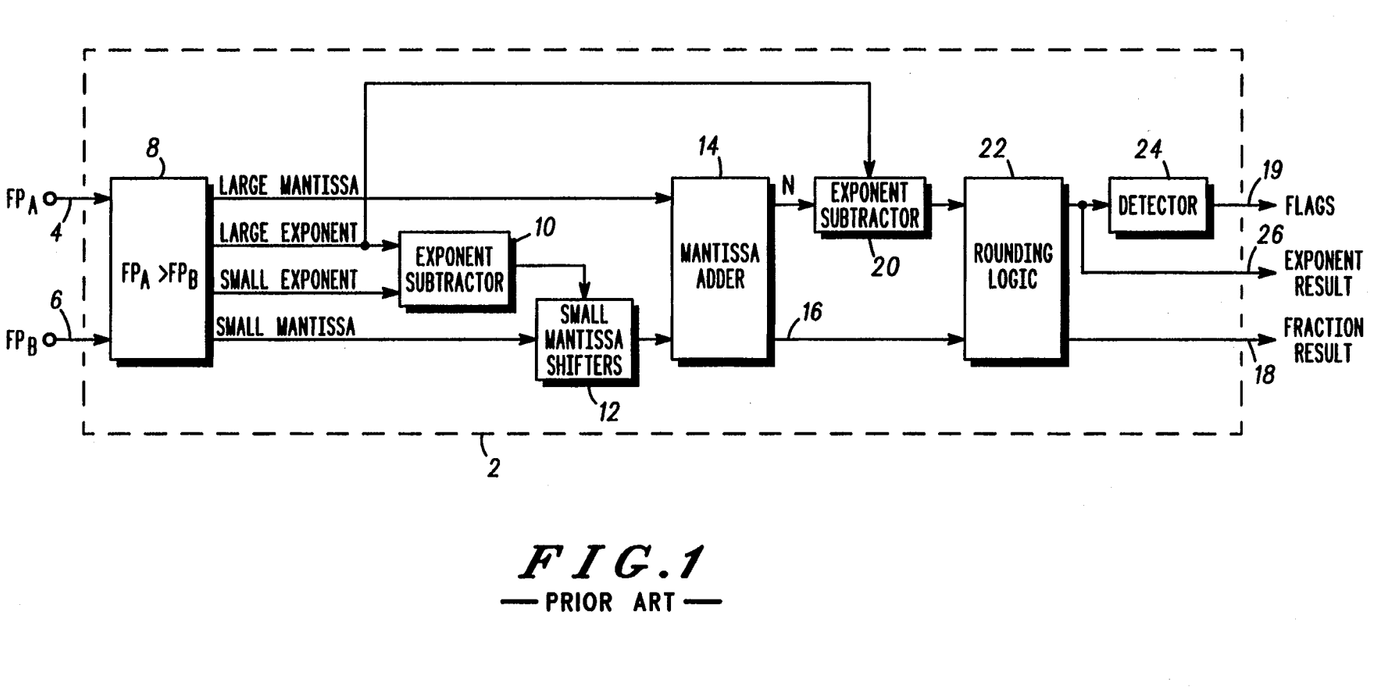
FIG. 1 shows a simplified block schematic diagram of a known floating point adder.

Referring firstly to FIG. 1, a known floating point adder 2 comprises two inputs 4 and 6 for receiving two floating point numbers $FP_A$ and $FP_B$. The inputs 4 and 6 are coupled to a circuit 8 which determines which one of the two floating point numbers $FP_A$ and $FP_B$ is the smaller. Circuit 8 provides four outputs: the mantissas of the greater and smaller floating point numbers, and the exponents of the greater and smaller floating point numbers. The difference between the two exponents is calculated in exponent subtractor 10 and the result is passed to the smaller mantissa shifter 12. The smaller mantissa shifter 12 shifts the smaller mantissa right by the absolute value of the exponent difference. The shifted result is then passed to a mantissa adder 14.

The mantissa adder 14 adds the greater mantissa and the shifted smaller mantissa, normalises the result and provides a normalised result at an output 16. The mantissa adder 14 also encodes the number of left shifts required to normalise the result and provides an encoded binary value N to an exponent subtractor 20. The exponent subtractor 20 subtracts the binary value from the greater exponent so as to update the exponent result. For double-precision format (where the mantissa comprises 53 bits), the binary value N is 6 bits wide.

Rounding logic 22 'rounds' the normalised mantissa result. If the normalised mantissa result comprises all '1's, on rounding the rounding logic 22 adds '1' to the mantissa result, so that the rounded mantissa result overflows. When this happens, the mantissa rounded result is shifted one bit right and the exponent result is incremented so as to provide the rounded exponent result (EXP_high).

The normalised mantissa result (rounded) is outputted at a first output 18 of the floating point adder 2 and the exponent result (rounded or not) is coupled to a second output 26 of the floating point adder and to an overflow and underflow detector 24.

The overflow and underflow detector 24 checks that the exponent result (or 'rounded' exponent result, if rounding is required) has a value within the predetermined range and generates overflow and underflow flags accordingly. The overflow and underflow flags are also outputted with the addition result at a third output 19 of the floating point adder 2.

Overflow and underflow of an exponent result is detected by detector 24 according to the following conditions.

For single-precision format:
1. If the exponent result is $\leq 896$, then underflow is detected: and
2. If the exponent result is $\leq 1151$, then overflow is detected.

For double-precision format:
3. If the exponent result is $\leq 0$, then underflow is detected: and
4. If the exponent result is $\leq 2047$, then overflow is detected.

Figure 2:
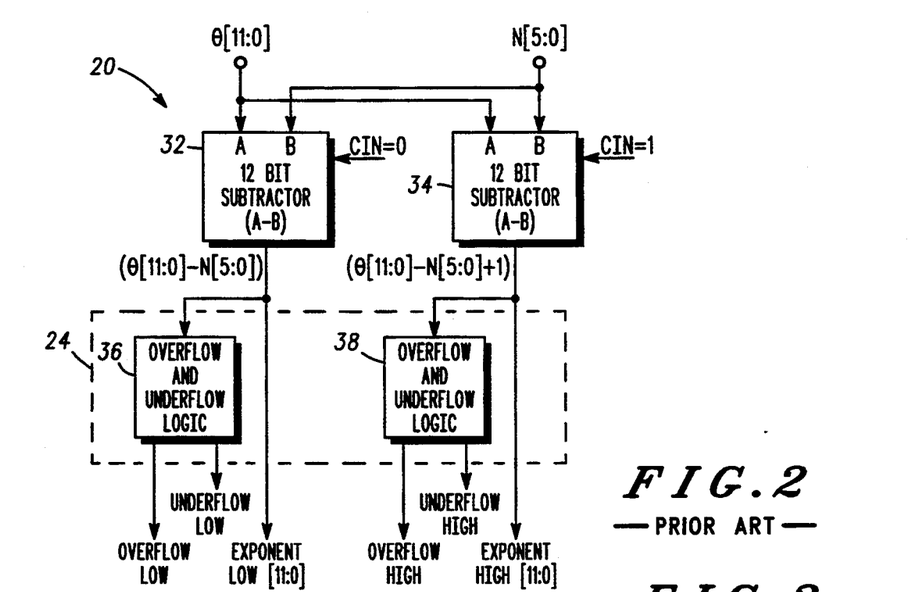
FIG. 2 is a simplified schematic diagram of the exponent subtractor and overflow and underflow detector of the floating point adder of FIG. 1.

Referring now also to FIG. 2 which shows the exponent subtractor 20 and overflow and underflow detector 24. Overflow and underflow detector 24 comprises overflow and underflow logic 36 and overflow and underflow logic 38.

The binary value N is coupled to first inputs B of first 32 and second 34 12-bit subtractors. The greater exponent e(11:0) is coupled to second inputs A of the first 32 and second 34 subtractors. The first subtractor 32 subtracts the binary value N from the greater exponent e to provide the 12 bit exponent result EXP_low(11:0)=e−N at an output thereof. The second subtractor 34 subtracts the binary value N from the greater exponent to which one has been added (e+1), so as to provide the 12 bit 'rounded' exponent result EXP_high(11:0)=e−N+1 at an output thereof. These two exponent results are fed to the respective overflow and underflow logic circuits 36 and 38.

Overflow and underflow logic circuit 36 detects if the exponent result EXP_low satisfies either one of the above conditions 1 or 2 (for single-precision format), or the above conditions 3 or 4 (for double-precision format), and in response thereto produces one set of flags, overflow_low and underflow_low. Overflow and underflow logic circuit 38 detects if the 'rounded' exponent result EXP_high satisfies either one of above conditions 1 or 2 (for single-precision format), or conditions 3 or 4 (for double-precision format), and in response thereto produces a second set of flags, overflow_high and underflow_high.

The two exponent results EXP_low and EXP_high together with their respective flags, overflow_low and underflow_low and overflow_high and underflow_high, are coupled to the rounding logic 22.

If the rounding logic 22 determines that rounding of the exponent result is required, the 'rounded' exponent result EXP_high and the associated flags, overflow_high and underflow_high, are selected by the rounding logic 22 and coupled to the outputs of the floating point adder 2. If no exponent rounding is required, the exponent result EXP_low and the associated flags, overflow_low and underflow_low, are coupled to the outputs.

Figure 3:
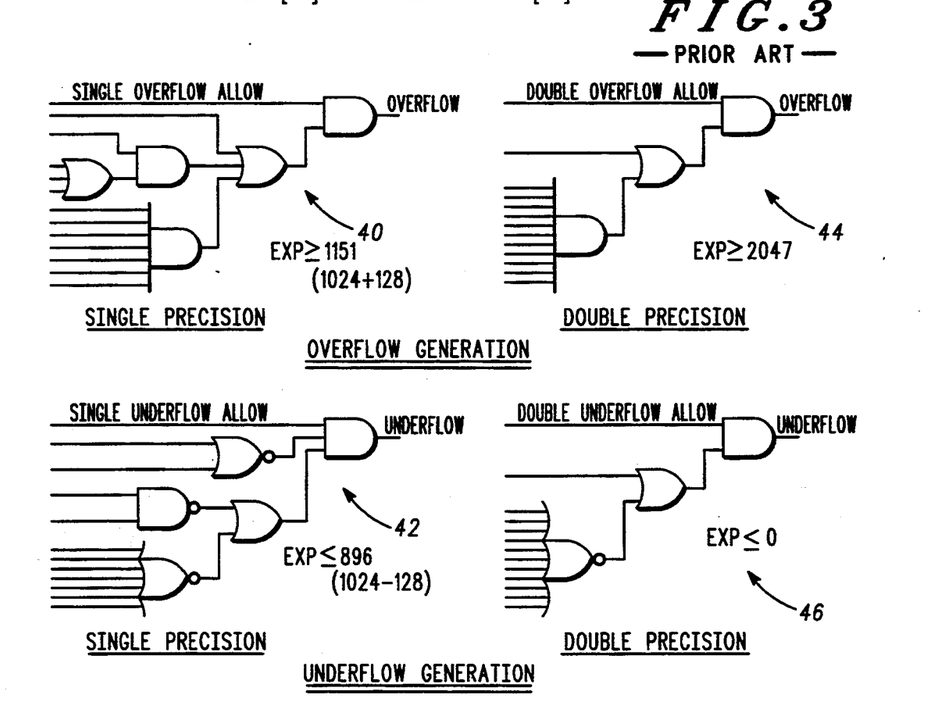
FIG. 3 is a logic diagram of the overflow and underflow detection logic of FIG. 2.

FIG. 3 shows overflow and underflow logic, for single- and double-precision, which may be implemented in overflow and underflow logic circuits 36 and 38 to detect the conditions 1-4 outlined above: overflow logic comprises an arrangement of logic gates 40 for single-precision and an arrangement of logic gates 44 for double-precision, and underflow logic comprises an arrangement of logic gates 42 for single precision, and an arrangement of logic gates 46 for double precision. The inputs single_ovf_allow, double_ovf_allow and single_unf_allow and double_unf_allow select between the single- and double-precision logic. The 12 bits of the exponent result EXP_low and 'rounded' exponent result EXP_high are coupled to respective inputs 0-12 of each of the arrangements of logic gates 40, 42, 44, 46 of their respective overflow and underflow logic 36 and 38. Flags are generated by the logic according to the conditions outlined above.

Although the exponent subtractor 20 and overflow and underflow detector 24 of FIG. 2 produce both possible exponent results and their associated flags which reduces the delay in the critical path, three serial steps are required in order to generate overflow and underflow flags: these are, generating the extended binary value $N_{ext}$, subtracting $N_{ext}$ from the greater exponent e and the greater exponent plus one (e+1), checking the two possible exponent results, EXP_low and EXP_high, for overflow and underflow and generating overflow and underflow flags in response to the checking step. These serial steps require a significant amount of time and are in the critical path of the floating point adder 2 which limits the performance of the adder 2. Furthermore, the logic required is significantly large and complicated.

There is therefore a need to increase the speed and reduce the complexity of the generation of the overflow and underflow flags in a floating point adder.

Figure 4:
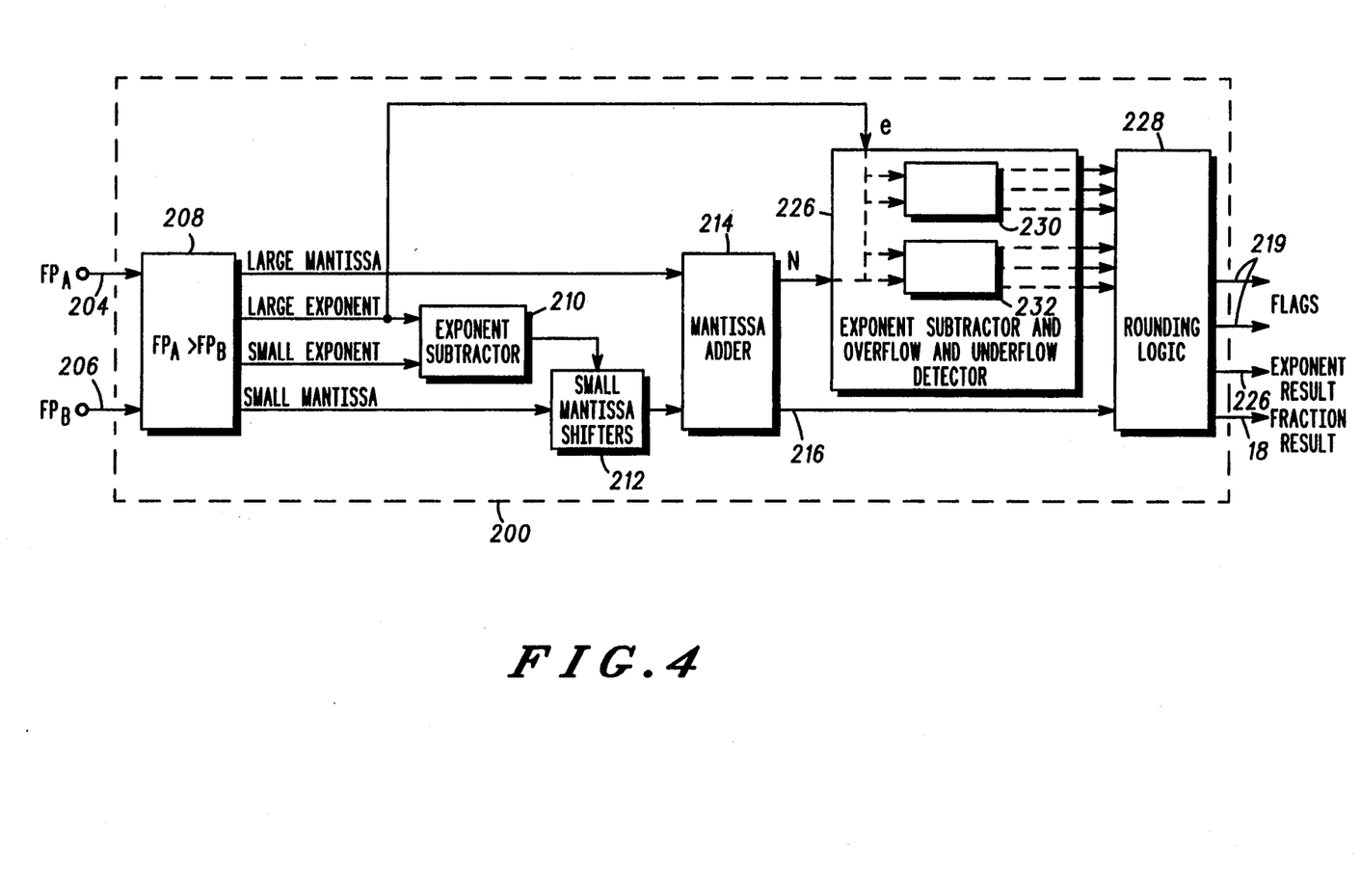
FIG. 4 shows a simplified block schematic diagram of a floating point adder in accordance with the present invention.

A floating point adder 200 incorporating an exponent subtractor and detector 226 in accordance with a preferred embodiment of the invention is shown in FIG. 4. Like components to those of FIG. 1 are referred to by the same reference numeral plus the number 200.

The exponent subtractor and overflow and underflow detector 226 comprises two parts: an exponent subtractor with underflow flag generation 230 (described with reference to FIG. 5) and an exponent subtractor with overflow flag generation 232 (described with reference to FIG. 6).

The exponent subtractor with underflow flag generation 230 receives the binary value N and the greater exponent e and provides three output signals to rounding logic 228: a low exponent result EXP_low(11:0)=e(11:0)−N(5:0), and two underflow flags, Underflow_low and Underflow_high.

The exponent subtractor with overflow flag generation 232 receives the binary value N and the greater exponent e incremented by two and provides three output signals to rounding logic 228: a high exponent result EXP_high(11:0)=e(11:0)−N(5:0)+1, and two overflow flags, Overflow_low and Overflow_high.

The rounding logic 228, in addition to the outputs from the exponent subtractor and overflow and underflow detector 226, receives the normalised mantissa from output 216 of the mantissa adder 214. The rounding logic 228 'rounds' the mantissa result and outputs this 'rounded' result at a first output 218 of the floating point adder 200. The rounding logic 228 also determines whether exponent rounding is required. If exponent rounding is required, the rounding logic 228 selects the high exponent result EXP_high and its associated flags Underflow_high and Overflow_high which are outputted at outputs 226 and 219 respectively of the floating point adder 200. If exponent rounding is not required, the rounding logic 228 selects the low exponent result EXP_low and its associated flags Underflow_low and Overflow_low which are outputted at outputs 226 and 219 respectively.

Figure 5:
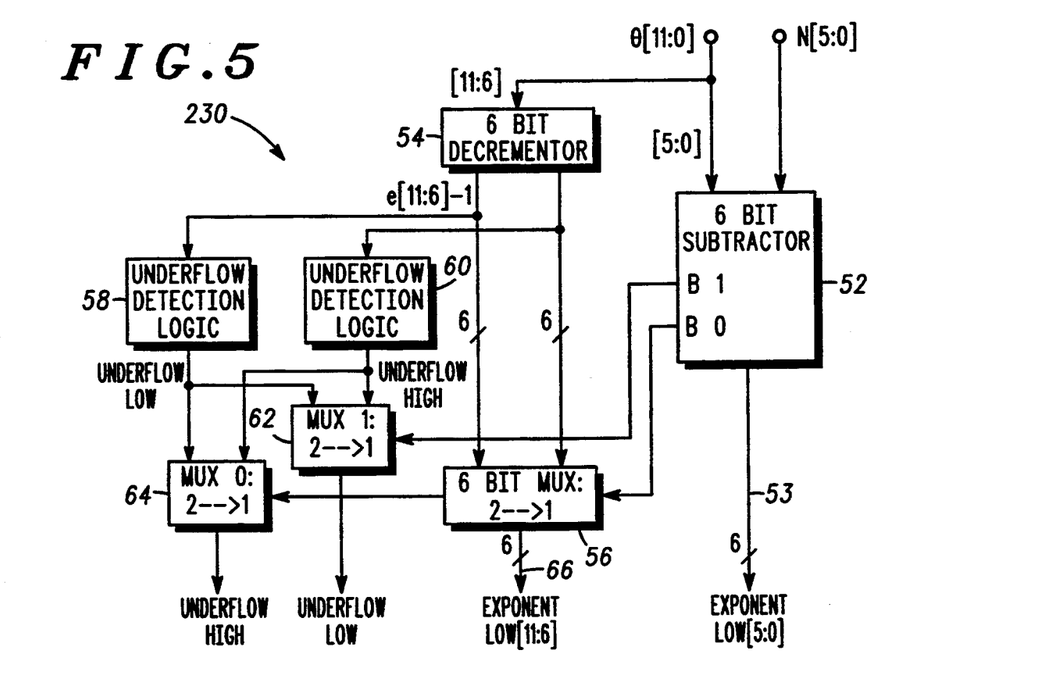
FIG. 5 shows a simplified schematic diagram of an exponent subtractor with underflow flag generation in accordance with the present invention.

Referring now also to FIG. 5, an exponent subtractor with underflow flag generation 230 in accordance with a preferred embodiment of the present invention comprises means for subtracting the 6 bit binary value N(5:0) from the greater exponent e(11:0) and means for generating the underflow flags, Underflow_low and Underflow_high, in parallel with the subtracting means.

Exponent subtractor 230 receives the 12 bit greater exponent e(11:0) and the 6 bit binary value N(5:0). Since a 6 bit value (N) is subtracted from the exponent result during exponent updating, the Most Significant Bits (MSBs) of the exponent result can have only two possible values: original value or original value −1. Thus, in the preferred embodiment, the 6 Least Significant Bits (LSBs) e(5:0) of the greater exponent are fed to one input of a 6-bit subtractor 52 and the 6 Most Significant Bits (MSBs) of the greater exponent (11:6) are coupled to a 6-bit decrementor 54, a first input of a 6-bit multiplexer 56 and to first underflow detection logic 60.

The 6-bit subtractor 52 subtracts the binary value N(5:0), which is coupled to a second input of the subtractor 52, from the 6 LSBs e(5:0) of the greater exponent and provides a 6 bit exponent result EXP_low(5:0) at an output 53. The decrementor 54 subtracts '1' from the 6 MSBs e(11:6) of the greater exponent and the decremented result (e(11:6)−1) is fed to a second input of the 6-bit multiplexer 56 and to second underflow detection logic 58. Since the generation of the binary value N(5:0) is in the critical path, the value (e(11:6)−1) is ready long before the control to the multiplexer 56 is generated.

A first multiplexer 62 receives an output signal from both the first 60 and second 58 underflow detection logic and provides a first underflow flag Underflow_low. A second multiplexer 64 receives an output signal from both the first 60 and second 58 underflow detection logic and provides a second underflow flag Underflow_high. The operation of the first 60 and second 58 underflow detection logic will be described in detail with reference to FIG. 7.

Figure 7:
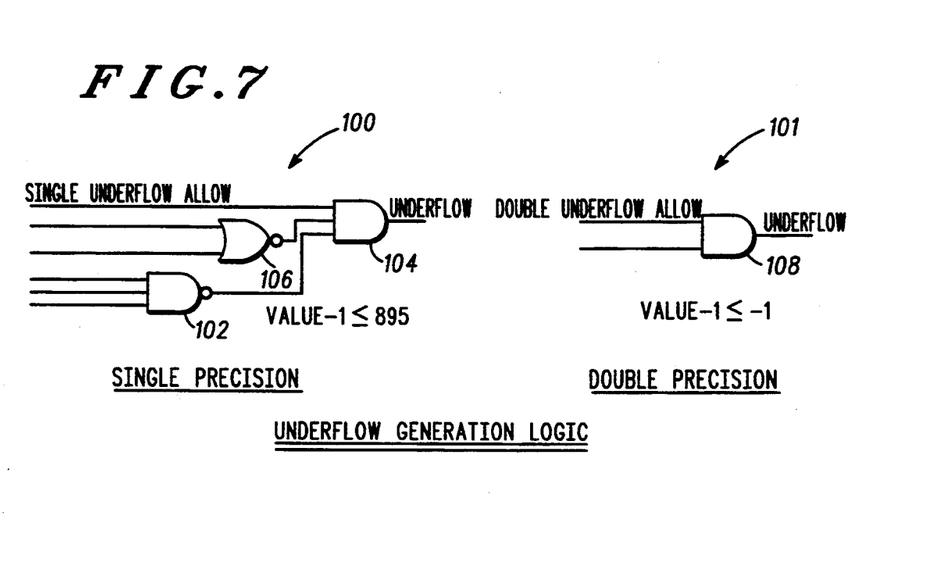
FIG. 7 is a logic diagram of the underflow detection logic of FIG. 5.

Referring now also to FIG. 7, the first 60 and second 58 underflow detection logic in accordance with the invention are arranged to generate underflow flags for the (value −1) of the exponent result. This means that the underflow conditions 1 and 3, specified above, become:

For single-precision format:
1. If the (exponent result −1) is ≦895, then underflow is detected: and For double-precision format:
3. If the (exponent result −1) is ≦−1, then underflow is detected.

Thus, the exponent −1 (the 'decremented' exponent) values of the two results EXP_low and EXP_high, (e(11:0)−N(5:0)−1) and (e(11:0)−N(5:0)) respectively, are checked for underflow. Furthermore, only the 5 MSBs e(11:7) of the decremented exponents are required in order to detect underflow for single-precision and only the MSB e(11) is required for double-precision.

The first underflow detection logic 60 detects underflow for the exponent value e(11:6) and provides an output U_high. The second underflow detection logic 58 detects underflow for the exponent value (e(11:6)−1) and provides an output U_low.

For single-precision, the underflow detection logic arrangement 100 comprises a NAND gate 102, a NOR gate 106 and an AND gate 104. The NAND gate 102 has three inputs for receiving the eighth e(7), ninth e(8) and tenth e(9) bits of the decremented exponent and has an output coupled to a first input of the AND gate 104. The NOR gate 106 has two inputs for receiving the eleventh e(10) and twelfth e(11) bits of the decremented exponent and an output coupled to a second input of the AND gate 104. The AND gate 104 has a third input for receiving a single-precision underflow allow signal (single_unf_allow) and an output for providing an underflow flag. If the value of the underflow flag is logic '1', then the decremented exponent (exponent result −1) ≦895, and underflow has been detected for the exponent result. If the value of the underflow flag is logic '0', then there is no underflow for the exponent result.

For double-precision, the underflow detection logic arrangement 101 comprises an AND gate 108 having a first input for receiving the twelfth bit e(11) of the decremented exponent, a second input for receiving a double-precision underflow allow signal (double_unf_allow) and an output for providing an underflow flag. If the value of the underflow flag is logic '1', then the decremented exponent (exponent result −1) ≦−1, and underflow has been detected for the exponent result. If the value of the underflow flag is logic '0', then there is no underflow.

The underflow detection logic arrangements 100 and 101 have underflow allow signal inputs in order to select between single- and double-precision formats and also, to prevent false generation of underflow flags due to the subtraction of the binary value N. These controls are calculated from the exponent value before subtraction.

The 6-bit subtractor 52, in the preferred embodiment is implemented as a carry select subtractor, which generates two borrow flags: B_1 is the first borrow flag for the operation (e(5:0)−N(5:0)−1), and B_0 is the second borrow flag for the operation (e(5:0)−N(5:0)). The second borrow flag B_0 is coupled to a control input of the 6-bit multiplexer 56. The value of the second borrow flag B_0 selects whether the decremented 6 bit result (e(11:6)−1), at the second input of the 6-bit multiplexer 56, or the 6 MSBs e(11:6) of the greater exponent, at the first input of the 6-bit multiplexer 56, provides the 6 bit output EXP_low(11:6) at an output 66 of the 6-bit multiplexer 56. If the value of B_0 is '1', then the borrow from the subtractor 52 is 1 and the decremented result (e(11:6)−1) is selected by the 6-bit multiplexer 56. If the value of B_0 is '0', then the borrow from the subtractor 52 is 0 and the 6 MSBs e(11:6) is selected by the 6-bit multiplexer 56. The second borrow flag is also fed to the second multiplexer 64 such that the Underflow_high flag is the underflow flag of (e(11:0)−N(5:0)). The first borrow flag B_1 is coupled to the first multiplexer 62 such that the Underflow_low flag is the underflow flag of (e(11:0)−N(5:0)−1). The values of the first and second borrow flags B_0 and B_1 determine whether the outputs U_low or U_high are selected by first 62 and second 64 multiplexers.

The selected 6-bit output 66 is combined with the output 53 such that the exponent subtractor 230 provides the 12-bit exponent result EXP_low(11:0)-=(e(11:0)−N(5:0)), in addition to the two underflow flags, Underflow_low and Underflow_high.

Since the underflow detection logic is arranged so that only the higher bits of the exponent result need be checked for underflow, and a decrementor 54 is used to generate the two possible results (original value or (original value −1) for the 6 MSBs, the two results and their underflow flags can be generated before the subtractor 52 completes the subtraction.

Figure 6:
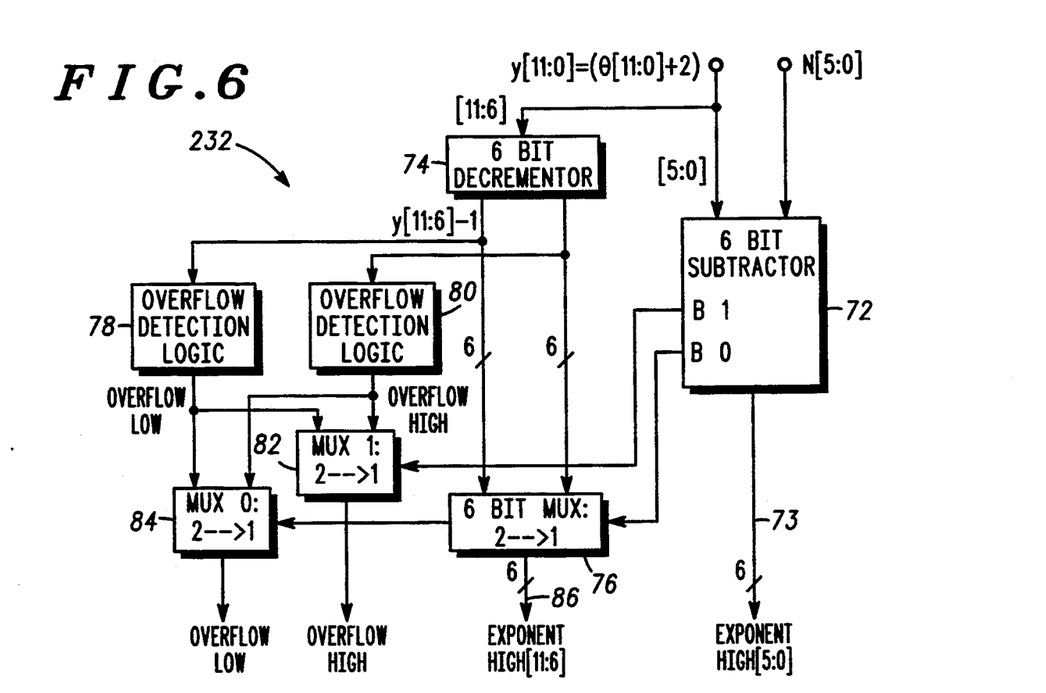
FIG. 6 shows a simplified schematic diagram of an exponent subtractor with overflow flag generation in accordance with the present invention.

Referring now also to FIG. 6, an exponent subtractor with overflow flag generation 232 in accordance with a preferred embodiment of the present invention comprises means for subtracting the binary value N from an exponent value y(11:0), where y(11:0)=e(11:0)+2, and means for generating the overflow flags, Overflow_low and Overflow_high, in parallel with the subtracting means. The value y=e+2 is obtained by adding 2 to the greater exponent e using a small incrementor (not shown). The incrementor is not in the critical path and therefore can be relatively slow.

Exponent subtractor 232 receives the 12 bit exponent value y(11:0) and the 6 bit binary value N(5:0). The 6 LSBs of the exponent value y(5:0) are fed to one input of a 6-bit subtractor 72 and the 6 MSBs of the exponent value y(11:6) are coupled to a 6-bit decrementor 74, a first input of a 6-bit multiplexer 76 and to first overflow detection logic 80. The 6-bit subtractor 72 subtracts the binary value N(5:0), which is coupled to a second input of the subtractor 72, from the 6 LSBs y(5:0) of the exponent value and provides a 6 bit exponent result EXP_high(5:0) at an output 73. The decrementor 74 subtracts '1' from the 6 MSBs y(11:6) of the exponent value and the decremented result (y(11:6)−1) is fed to a second input of the 6-bit multiplexer 76 and to second overflow detection logic 78.

A first multiplexer 82 receives an output signal from both the first 80 and second 78 overflow detection logic and provides a first overflow flag Overflow_high. A second multiplexer 84 receives an output signal from both the first 80 and second 78 overflow detection logic and provides a second overflow flag Overflow_low. The operation of the first 80 and second 78 overflow detection logic will be described in detail with reference to FIG. 8.

Figure 8:
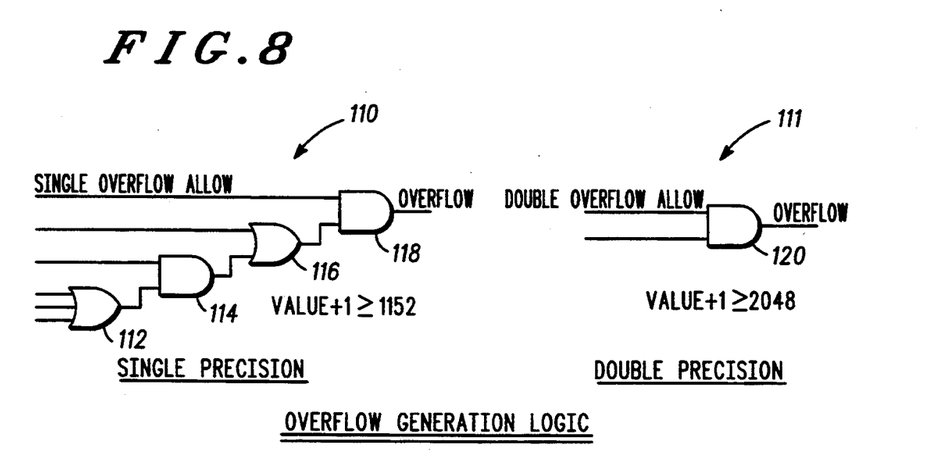
FIG. 8 is a logic diagram of the overflow detection logic of FIG. 6.

Referring now also to FIG. 8, the first 80 and second 78 overflow detection logic in accordance with the invention are arranged to generate overflow flags for the (value+1) of the exponent result. This means that the overflow conditions 2 and 4, specified above, become:

For single-precision format:
2. If the (exponent result+1) is $\leq 1152$, then overflow is detected, and For double-precision format:
4. If the (exponent result+1) is $\leq 2048$, then overflow is detected.

Thus, the exponent +1 (the 'incremented' exponent) values of the two results EXP_low and EXP_high, (e(11:0)−N(5:0)+1) and (e(11:0)−N(5:0)+2) respectively, are checked for overflow. Furthermore, only the 5 MSBs e(11:7) of these incremented exponents are required in order to detect overflow for single-precision and only the MSB e(12) is required for double-precision.

The first overflow detection logic 80 detects overflow for the exponent value y(11:6) and provides an output O_high. The second overflow detection logic 78 detects overflow for the decremented exponent value (y(11:6)−1) and provides an output O_low.

For single-precision, the overflow detection logic arrangement 110 comprises first 112 and second 116 OR gates and first 114 and second 118 AND gates. The first OR gate 112 has three inputs for receiving the eighth, ninth and tenth bits of the incremented exponent and has an output coupled to a first input of the first AND gate 114. The eleventh bit is coupled to a second input of the first AND gate 114. The output of AND gate 114 is coupled to a first input of the second OR gate 116. A second input of the second OR gate 116 is coupled to receive the twelfth bit and the output of the second OR gate 116 is coupled to a first input of the second AND gate 118. AND gate 118 has a second input for receiving a single-precision overflow allow control signal (single_ovf_allow) and output for providing an overflow flag. If the value of the overflow flag is logic '1', then overflow has been detected for the exponent result. If the value of the overflow flag is logic '0', then there is no overflow.

For double-precision, the overflow detection logic arrangement 111 comprises an AND gate 120 having a first input for receiving the twelfth bit of the incremented exponent, a second input for receiving a double-precision overflow allow signal (double_ovf_allow) and an output for providing an overflow flag. If the value of the overflow flag is logic '1', then overflow has been detected for the exponent result. If the value of the overflow flag is logic '0', then there is no overflow.

The overflow detection logic arrangements 110 and 111 have overflow allow signal inputs in order to select between single- and double-precision formats and also, to prevent false generation of overflow flags due to the subtraction of the binary value N. These controls are calculated from the exponent value before subtraction.

The 6-bit subtractor 72 in the preferred embodiment is implemented as a carry select subtractor which generates two borrow flags: B_1 is the first borrow flag for the operation (y(5:0)−N(5:0)−1), and B_0 is the second borrow flag for the operation (y(5:0)−N(5:0)). The first borrow flag B_1 is coupled to the 6-bit multiplexer 76. The value of the first borrow flag B_1 selects whether the decremented 6 bit result (y(11:6)−1), at the second input of the 6-bit multiplexer 76, or the exponent value y(11:6), at the first input of the 6-bit multiplexer 76, provides the 6 bit output EXP_high(11:6) at an output 86 of the 6-bit multiplexer 76. If the value of B_1 is '1', then the borrow from the subtractor 72 is 1 and the decremented result (y(11:6)−1) is selected by the 6-bit multiplexer 76. If the value of B_1 is '0', then the borrow from the subtractor 72 is 0 and the exponent value y(11:6) is selected by the 6-bit multiplexer 76. The first borrow flag B_1 is also fed to the second multiplexer 84 such that the Overflow_low flag is the overflow flag of (y(11:0)−N(5:0)−1). The second borrow flag B_0 is coupled to the first multiplexer 82 such that the Overflow_high flag is the overflow flag of (y(11:0)−N(5:0)). The values of the first and second borrow flags B_1 and B_0 determine whether the outputs O_low or O_high are selected by first 82 and second 84 multiplexers.

The selected 6-bit output 86 is combined with the output 73 such that the exponent subtractor 232 provides the 12-bit exponent result EXP_high=((e(11:0)−N(5:0)+1)=EXP_low+1, in addition to the two overflow flags Overflow_low and Overflow_high.

Since the overflow detection logic is arranged so that only the higher bits of the exponent result need be checked for overflow, and a decrementor 74 is used to generate the two possible results (original value or (original value −1) for the 6 MSBs, the two results and their overflow flags can be generated before the subtractor 72 completes the subtraction.

The exponent subtractor and overflow and underflow detector 226 therefore generates two exponent results and each results associated overflow and underflow flags: EXP_low=(e(11:0)−N(5:0)) with Underflow_low (obtained from (e(11:0)−N(5:0)−1) and Overflow_low (obtained from (e(11:0)−N(5:0)+1); and EXP_high=(e(11:0)−N(5:0)+1) with Underflow_high (obtained from (e(11:0)−N(5:0)) and Overflow_high (obtained from (e(11:0)−N(5:0)+2). Thus, by correctly coupling the borrow flags to the multiplexers, the two underflow flags and two overflow flags can be generated at the same time as the exponent results.

The following examples illustrate the detection of underflow in single precision numbers in the floating point adder 200.

e[11:0] = 901  (001110000101)
e[5:0] is 5
e[11:6] are the same as in case (exp[11:0] = 896) - which is just the boundary value for single precision underflow detection.
So, for this example:
U_high = 0, since (EXP[11:0]>=896) does not detect underflow in the underflow detection logic
U_low = 1, since (EXP[11:0]<=895) detects underflow in the underflow detection logic
The B_1, B_0 outputs will choose the correct Underflow_low and Underflow_high flags. The values of B_1, B_0 depend on the N[5:0] input.

Case 1:  N[5:0] = 4 (000100)
In this case:
B_1 = 0   (5 − 4 − 1 = 0) so borrow is not generated.
B_0 = 0   (5 - 4 = 1) so borrow is not generated.
Therefore:
Underflow_low = 0   if (B_1 = 0) U_high is chosen in Mux_1 (62)
Underflow_high = 0   if (B_0 = 0) U_high is chosen in Mux_0 (64)
No underflow will be detected for either Exp_low or Exp_high.

Case 2;  N[5:0] = 6 (000110)
In this case:
B_1 = 1   (5 − 6 − 1 = −2) so borrow is generated.
B_0 = 1   (5 − 6 = −1) so borrow is generated.
Therefore:
Underflow_low = 1   if (B_1 = 1) U_low is chosen in Mux_1 (62)
Underflow_high = 1   if (B_0 = 1) U_low is chosen in Mux_0 (64)

-continued

| | |
|---|---|
| Underflow will be detected for both Exp_low and Exp_high | |
| Case 3: | N[5:0] = 5 (000101) |
| In this case: | |
| B_1 = 1 | (5 − 5 − 1 = −1) so borrow is generated. |
| B_0 = 0 | (5 − 5 = 0) so borrow is not generated. |
| Therefore: | |
| Underflow_low = 1 | if (B_1 = 1) U_low is chosen in Mux_1 (62) |
| Underflow_high = 0 | if (B_0 = 0) U_high is chosen in Mux_0 (64) |
| Underflow will be detected only for Exp_low. | |

It will be appreciated that generation of overflow flags is done in a similar method.

In summary, the present invention ensures that the underflow and overflow detection for the two possible exponent results are completed, and valid overflow and underflow flags generated, before the completion of the updating of the exponent result in the subtractor. Thus, the present invention has advantages over the known floating point adders, which check the updated exponent result after it has been generated, since the parallel operation of the present invention reduces the delay in the critical path of the floating point adder. Furthermore, since the present invention generates and checks the exponent +1 value and the exponent −1 value for overflow and underflow respectively, the logic can be reduced to only the high bits of the exponent result. This considerably simplifies the logic required.

What we claim is:

1. A method of generating an exponent result and a rounded exponent result for an addition operation performed on two numbers in a floating point adder and for generating overflow and underflow flags for the exponent result and the rounded exponent result, wherein each number comprises an exponent and a mantissa, the method comprising the steps of:
   generating first and second exponent values using the greater exponent of the two numbers, each of the first and second exponent values comprising n bits;
   providing a binary value which represents a number of bit shifts required to normalise a mantissa result produced by the addition operation, the binary value comprising m bits, where m is less than n;
   dividing each one of the first and second exponent values into two groups of bits, a first group comprising m of the least significant bits of an exponent value and a second group comprising (n-m) of the most significant bits of the exponent value;
   decrementing the second group of (n-m) bits of each of the first and second exponent values by one so as to provide a decremented most significant bit result for the each of the first and second exponent values;
   detecting underflow of the exponent result and rounded exponent result by checking the decremented most significant bit result of the first exponent value and the second group of (n-m) bits of the first exponent value respectively and generating in response to the checking step first and second underflow flags respectively;
   detecting overflow of the exponent result and rounded exponent result by checking the decremented most significant bit result of the second exponent value and the second group of (n-m) bits of the second exponent value respectively and generating in response to the checking step first and second overflow flags respectively;
   subtracting the binary value from the first group of m bits of each of the first and second exponent values so as to provide a least significant bit subtraction result and borrow flags for each of the first and second exponent values, the borrow flags indicating whether the subtraction step generates a borrow of one or the subtraction step generates a borrow of zero;
   selecting for each of the first and second exponent values and in response to the borrow flags, the respective decremented most significant bit result for a borrow of one or the respective second group of (n-m) bits for a borrow of zero so as to provide a selected result for each of the first and second exponent values;
   combining for each of the exponent values the respective selected result with the respective least significant bit subtraction result so as to generate the exponent result and the rounded exponent result; and
   providing the exponent result and corresponding first underflow flag and first overflow flag and providing the rounded exponent result and corresponding second underflow flag and second overflow flag at outputs of the floating point adder.

2. A method according to claim 1 wherein the subtracting step generates two borrow flags for each of the first and second exponent values, a first borrow flag representing the subtraction of the binary value from the first group of m bits of the respective exponent value decremented by one and a second borrow flag representing the subtraction of the binary value from the first group of m bits of the respective exponent value, the first and second borrow flags of each of the first and second exponent values having a first value if the subtraction step generates a borrow of one or a second value if the subtraction step generates a borrow of zero.

3. A method according to claim 2 wherein the value of the second borrow flag of the first exponent value determines the selected result of the first exponent value and the value of the first borrow flag of the second exponent value determines the selected result of the second exponent value.

4. A method according to claim 1, wherein the checking for underflow step comprises the step of determining whether the value of the decremented most significant bit result and the value of the second group of (n-m) bits of the first exponent value are less than a minimum predetermined value, and the checking for overflow step comprises the step of determining whether the value of the decremented most significant bit result and the value of the second group of (n-m) bits of the second exponent value are greater than a maximum predetermined value.

5. A method according to claim 4, wherein the underflow flag generating step comprises the steps of:
   generating a first signal having a first value when the decremented most significant bit result of the first exponent value is less than the minimum predetermined value;
   generating a second signal having the first value when the second group of (n-m) bits of the first exponent value is less than the minimum predetermined value;
   selecting one of the first and second signals in response to the value of the first borrow flag of the first exponent value to provide the first underflow flag; and selecting one of the first and second signals in response to the value of the second borrow flag of the first exponent value to provide the second underflow flag.

6. A method according to claim 5, wherein the overflow flag generating step comprises the steps of:

generating a first signal having a first value when the decremented most significant bit result of the second exponent value is greater than the maximum predetermined value;

generating a second signal having the first value when the second group of (n-m) bits of the second exponent value is greater than the maximum predetermined value;

selecting one of the first and second signals in response to the value of the first borrow flag of the second exponent value to provide the first overflow flag; and selecting one of the first and second signals in response to the value of the second borrow flag of the second exponent value to provide the second overflow flag.

7. A method according to claim 4, wherein the minimum predetermined value for single-precision format numbers is 895 and for double-precision format numbers is −1 and the maximum predetermined value for single-precision format numbers is 1152 and for double-precision format numbers is 2048.

8. A method according to claim 1, wherein the first exponent value is the value of the greater exponent of the two numbers and the second exponent value is the value of the greater exponent plus two.

9. An exponent subtractor system for generating an exponent result and a rounded exponent result for an addition operation performed on two numbers in a floating point adder and for generating overflow and underflow flags for the exponent result and the rounded exponent result, the system comprising:

means for generating first and second exponent values using the greater exponent of the two numbers, each of the first and second exponent values comprising n bits;

means for providing a binary value which represents a number of bit shifts required to normalise a mantissa result produced by the addition operation, the binary value comprising m bits, where m is less than n;

means for dividing each one of the first and second exponent values into two groups of bits, a first group comprising m of the least significant bits of an exponent value and a second group comprising (n-m) of the most significant bits of the exponent value;

decrementing means for decrementing the second group of (n-m) bits of each of the first and second exponent values by one so as to provide a decremented most significant bit result for the each of the first and second exponent values;

underflow detecting means for detecting underflow of the exponent result and rounded exponent result by checking the decremented most significant bit result of the first exponent value and the second group of (n-m) bits of the first exponent value respectively and generating in response to the checking step first and second underflow flags respectively;

overflow detecting means for detecting overflow of the exponent result and rounded exponent result by checking the decremented most significant bit result of the second exponent value and the second group of (n-m) bits of the second exponent value respectively and generating in response to the checking step first and second overflow flags respectively;

subtracting means for subtracting the binary value from the first group of m bits of each of the first and second exponent values so as to provide a least significant bit subtraction result and borrow flags for each of the first and second exponent values, the borrow flags indicating whether the subtraction step generates a borrow of one or the subtraction step generates a borrow of zero;

selecting means for selecting for each of the first and second exponent values and in response to the borrow flags, the respective decremented most significant bit result for a borrow of one or the respective second group of (n-m) bits for a borrow of zero so as to provide a selected result for each of the first and second exponent values;

combining means for combining for each of the exponent values the respective selected result with the respective least significant bit subtraction result so as to generate the exponent result and the rounded exponent result; and output means for outputting the exponent result and corresponding first underflow flag and first overflow flag and providing the rounded exponent result and corresponding second underflow flag and second overflow flag.

10. An exponent subtractor system according to claim 9 wherein the subtracting means comprises a first carry select subtractor for the first exponent value and a second carry select subtractor for the second exponent value, each one of the carry select subtractors comprising means for generating two borrow flags for the respective exponent value, a first borrow flag representing the subtraction of the binary value from the first group of m bits of the respective exponent value decremented by one and a second borrow flag representing the subtraction of the binary value from the first group of m bits of the respective exponent value, the first and second borrow flags of each of the first and second exponent values having a first value if a borrow of one is generated or a second value if a borrow of zero is generated.

11. An exponent subtractor system according to claim 10 wherein the selecting means comprises first and second multiplexers, the first multiplexer being coupled to receive the decremented most significant bit result and the second group of (n-m) bits of the first exponent value, and the second borrow flag of the first exponent value, and the second multiplexer being coupled to receive the decremented most significant bit result and the second group of (n-m) bits of the second exponent value and the first borrow flag of the second exponent value, the value of the second borrow flag of the first exponent value determining the selected result of the first exponent value and the value of the first borrow flag of the second exponent value determining the selected result of the second exponent value.

12. An exponent subtractor system according to claim 10, wherein the underflow detecting means comprises:

underflow logic for determining whether the value of the decremented most significant bit result and the value of the second group of (n-m) bits of the first exponent value are less than a minimum predetermined value, and for generating a first signal having a first value when the decremented most significant bit result of the first exponent value is less than the minimum predetermined value and a second signal having the first value when the second group of (n-m) bits of the first exponent value is less than the minimum predetermined value;

first selecting means coupled to receive the first and second signals and the first borrow flag of the first exponent value, the first selecting means selecting one of the first and second signals in response to the value of the received first borrow flag so as to provide the first underflow flag; and second selecting means coupled to receive the first and second signals and the second borrow flag of the first exponent value, the second selecting means selecting one of the first and second signals in response to the value of the received second borrow flag so as to provide the second underflow flag.

13. An exponent subtractor system according to claim 12 wherein the minimum predetermined value for single-precision format numbers is 895 and for double-precision format numbers is −1.

14. An exponent subtractor system according to claim 10, wherein the overflow detecting means comprises:

overflow logic means for determining whether the value of the decremented most significant bit result and the value of the second group of (n-m) bits of the second exponent value are greater than a maximum predetermined value, and for generating a first signal having a first value when the decremented most significant bit result of the second exponent value is greater than the maximum predetermined value and a second signal having the first value when the second group of (n-m) bits of the second exponent value is greater than the maximum predetermined value;

first selecting means coupled to receive the first and second signals and the first borrow flag of the second exponent value, the first selecting means selecting one of the first and second signals in response to the value of the received first borrow flag so as to provide the first overflow flag; and second selecting means coupled to receive the first and second signals and the second borrow flag of the second exponent value, the second selecting means selecting one of the first and second signals in response to the value of the received second borrow flag so as to provide the second overflow flag.

15. An exponent subtractor system according to claim 13 wherein the maximum predetermined value for single-precision format numbers is 1152 and for double-precision format numbers is 2048.

16. An exponent subtractor system according to claim 9 wherein the first exponent value is the value of the greater exponent of the two numbers and the second exponent value is the value of the greater exponent plus two.

17. A floating point adder for performing addition operations on two floating point numbers, each number comprising a mantissa and an exponent, the floating point adder comprising:

means for calculating the difference between the exponents of the two floating point numbers and for providing the difference result at an output thereof;

mantissa shifting means for determining which floating point number is smaller and for shifting the mantissa of the smaller floating point number right by the difference result;

a mantissa addition system for adding the shifted smaller mantissa with the greater mantissa so as to provide a normalised addition result and shift information which shift information represents the number of bit shifts required to normalise the mantissa addition result;

an exponent subtractor system for generating an exponent result and a rounded exponent result for the addition operation in dependence on the shift information generated by the mantissa addition system and for generating overflow and underflow flags for the exponent result and the rounded exponent result, the means for providing a binary value using the shift information to generate the binary value, the exponent subtractor system comprising;

means for generating first and second exponent values using the greater exponent of the two numbers, each of the first and second exponent values comprising n bits;

means for providing a binary value which represents a number of bit shifts required to normalise a mantissa result produced by the addition operation, the binary value comprising m bits, where m is less than n;

means for dividing each one of the first and second exponent values into two groups of bits, a first group comprising m of the least significant bits of an exponent value and a second group comprising (n-m) of the most significant bits of the exponent value;

decrementing means for decrementing the second group of (n-m) bits of each of the first and second exponent values by one so as to provide a decremented most significant bit result for the each of the first and second exponent values;

underflow detecting means for detecting underflow of the exponent result and rounded exponent result by checking the decremented most significant bit result of the first exponent value and the second group of (n-m) bits of the first exponent value respectively and generating in response to the checking step first and second underflow flags respectively;

overflow detecting means for detecting overflow of the exponent result and rounded exponent result by checking the decremented most significant bit result of the second exponent value and the second group of (n-m) bits of the second exponent value respectively and generating in response to the checking step first and second overflow flags respectively;

subtracting means for subtracting the binary value from the first group of m bits of each of the first and second exponent values so as to provide a least significant bit subtraction result and borrow flags for each Of the first and second exponent values, the borrow flags indicating whether the subtraction step generates a borrow of one or the subtraction step generates a borrow of zero;

selecting means for selecting for each of the first and second exponent values and in response to the borrow flags, the respective decremented most significant bit result for a borrow of one or the respective second group of (n-m) bits for a borrow of zero so as to provide a selected result for each of the first and second exponent values;

combining means for combining for each of the exponent values the respective selected result with the respective least significant bit subtraction result so as to generate the exponent result and the rounded exponent result; and output means for outputting the exponent result and corresponding first underflow flag and first overflow flag and providing the rounded exponent result and corresponding second underflow flag and second overflow flag;

rounding logic coupled to receive the normalised addition result and the exponent result and the rounded exponent result, the rounding logic for rounding the normalised addition result and for selecting one result of the exponent result and the rounded exponent result in dependence on the rounded addition result; and output means for outputting the rounded addition result and the selected exponent result.

* * * * *